(12) United States Patent
Weis et al.

(10) Patent No.: US 11,175,904 B2
(45) Date of Patent: Nov. 16, 2021

(54) METHOD FOR CONTROLLING A CHARGING STATION FOR CHARGING VEHICLES AND A CHARGING STATION AND A VEHICLE THEREFOR

(71) Applicant: DAIMLER AG, Stuttgart (DE)

(72) Inventors: Stefan Weis, Tübingen (DE); Christoph Schwill, Stuttgart (DE)

(73) Assignee: DAIMLER AG, Stuttgart (DE)

( * ) Notice: Subject to any disclaimer, the term of this patent is extended or adjusted under 35 U.S.C. 154(b) by 0 days.

(21) Appl. No.: 17/280,408

(22) PCT Filed: Sep. 9, 2019

(86) PCT No.: PCT/EP2019/073965
§ 371 (c)(1),
(2) Date: Mar. 26, 2021

(87) PCT Pub. No.: WO2020/069820
PCT Pub. Date: Apr. 9, 2020

(65) Prior Publication Data
US 2021/0311719 A1    Oct. 7, 2021

(30) Foreign Application Priority Data
Oct. 5, 2018   (DE) ..................... 10 2018 007 859.1

(51) Int. Cl.
*G06F 8/65*       (2018.01)
*B60L 53/66*      (2019.01)
(Continued)

(52) U.S. Cl.
CPC .............. *G06F 8/65* (2013.01); *B60L 53/305* (2019.02); *B60L 53/66* (2019.02); *G05B 19/0426* (2013.01); *G05B 2219/23008* (2013.01)

(58) Field of Classification Search
CPC . G06F 8/65; G06F 8/656; B60L 53/66; B60L 53/60
(Continued)

(56) References Cited

U.S. PATENT DOCUMENTS 9,152,408 B2 * 10/2015 Murata ..................... G06F 8/65
9,348,381 B2 *  5/2016 Khoo ................... G06Q 20/102
(Continued)

FOREIGN PATENT DOCUMENTS

DE    102015204362      *  9/2016
DE    102015208786 A1    11/2016
(Continued)

OTHER PUBLICATIONS

Office Action dated Mar. 11, 2021 in related/corresponding DE Application No. 10 2018 007 859.1.
(Continued)

*Primary Examiner* — Richard V Muralidar
(74) *Attorney, Agent, or Firm* — Patent Portfolio Builders PLLC

(57) ABSTRACT

A method for controlling a charging station for charging vehicles in which a first charging unit of the charging station is coupled to a second charging unit of the relevant vehicle for transmitting current. When one of the vehicles is charged, an update operation of the charging station is performed, in which a control assembly of the one vehicle transmits a current software packet to a control device of the charging station.

14 Claims, 2 Drawing Sheets

Figure 1:
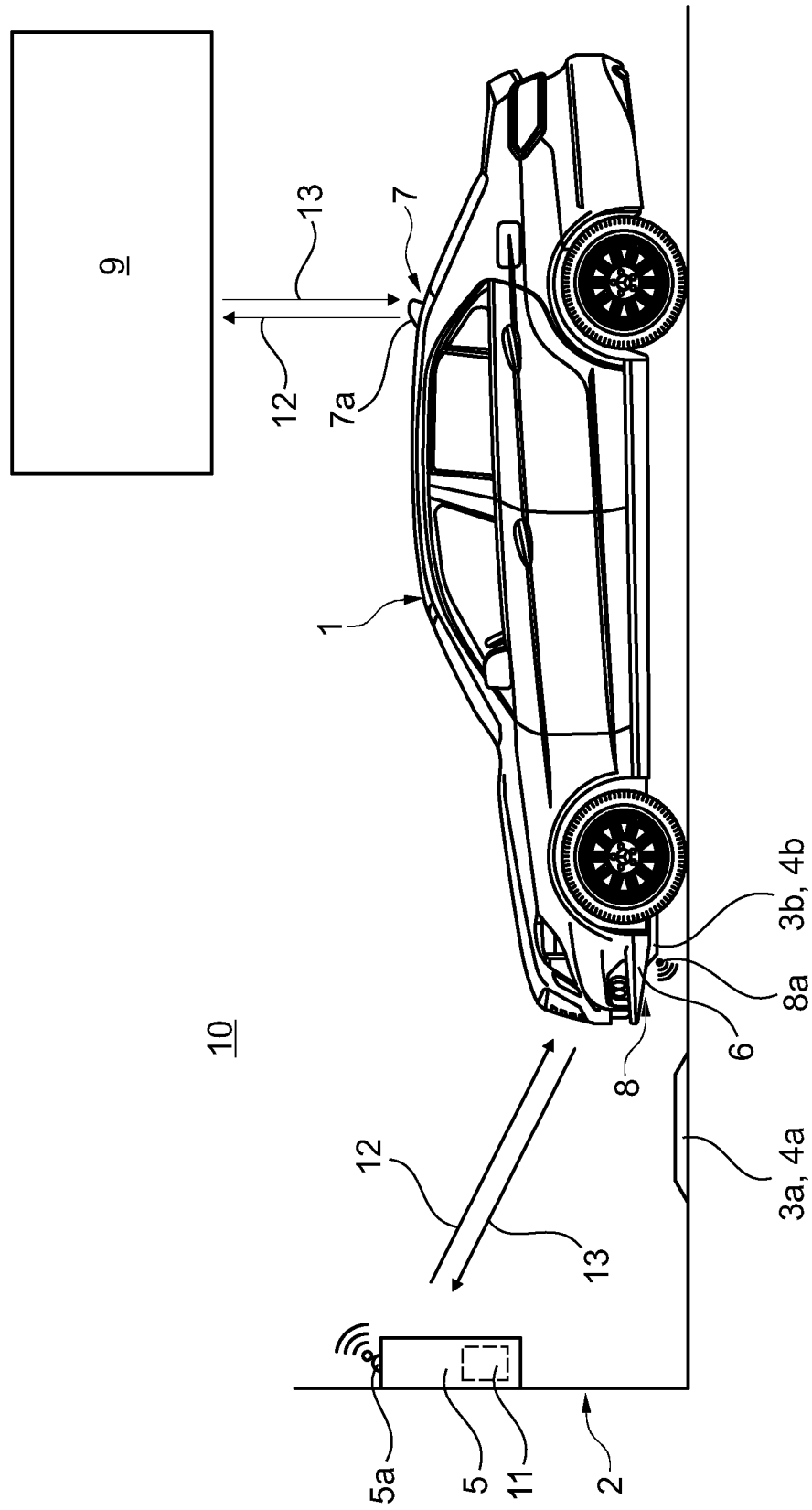

(51) Int. Cl.
  *G05B 19/042* (2006.01)
  *B60L 53/30* (2019.01)
(58) Field of Classification Search
  USPC .......................................... 320/109; 717/168
  See application file for complete search history.

(56) References Cited

U.S. PATENT DOCUMENTS

| | | | | |
|---|---|---|---|---|
| 10,106,045 | B2* | 10/2018 | Beattie, Jr. | ............ B60L 53/126 |
| 10,391,876 | B2* | 8/2019 | Nordbruch | ............ G07F 15/003 |
| 10,481,896 | B2* | 11/2019 | Rocci | ...................... B60L 53/14 |
| 2013/0214738 | A1 | 8/2013 | Chen et al. | |
| 2013/0314043 | A1 | 11/2013 | Bouman | |
| 2018/0091191 | A1 | 3/2018 | Berger et al. | |
| 2019/0294135 | A1* | 9/2019 | Madrid | .................. B60L 53/66 |

FOREIGN PATENT DOCUMENTS

| | | |
|---|---|---|
| EP | 2819265 A1 | 12/2014 |
| WO | 2013115428 A1 | 8/2013 |
| WO | 2017171561 A1 | 10/2017 |

OTHER PUBLICATIONS

Decision to Grant dated Mar. 12, 2021 in related/corresponding EP Application No. 19768751.0.
International Search Report dated Dec. 12, 2019 in related/corresponding International Application No. PCT/EP2019/073965.
Microsoft; "Blockieren veralteter ActiveX-Steuerelemente;" May 10, 2018; https://docs.microsoft.com/de-de/internet-explorer/ie11-deploy-guide/out-of-date-activex-control-blocking.
Notice of Refusal (Article 94(3)) dated Jun. 5, 2020 in related/corresponding EP Application No. 19768751.0.
Written Opinion dated Dec. 12, 2019 in related/corresponding International Application No. PCT/EP2019/073965.

* cited by examiner

METHOD FOR CONTROLLING A CHARGING STATION FOR CHARGING VEHICLES AND A CHARGING STATION AND A VEHICLE THEREFOR

BACKGROUND AND SUMMARY OF THE INVENTION

Exemplary embodiments of the invention relate to a method for controlling a charging station for charging vehicles and to the correspondingly designed charging station and the correspondingly designed vehicle.

Electrically operated vehicles must be charged regularly. For this purpose, the respective vehicles can be coupled to a charging station in a current-transmitting manner and charged. In order for the charging of the respective vehicles to run smoothly, the software of the vehicle and the software of the charging station must be compatible with each other. Since the charging stations do not have an Internet connection for security reasons, their software must be updated manually by the owner. If the software of the charging station is no longer compatible with the software of the vehicle, no vehicle can be charged at the charging station. In this case, the charging station must be brought up to date at great expense and, in rare cases, even sent to the manufacturer for updating. US2013/214738A1 discloses a method for controlling a charging station for charging vehicles, according to the prior art.

Therefore, exemplary embodiments of the invention are directed to improving a method for controlling a charging station or at least to design it alternatively. In particular, a malfunction of the charging station as a result of software that is not up-to-date should thus be prevented. Exemplary embodiments are also directed to a charging station suitable for carrying out the method and a vehicle suitable for carrying out the method.

Exemplary embodiments provide a charging station suitable for carrying out the method and a vehicle suitable for carrying out the method.

In a method for controlling a charging station for charging vehicles, a first charging unit is coupled to a second charging unit of the respective vehicle in a current-transmitting manner during the charging of the respective vehicle. According to the invention, during charging of one of the respective vehicles, an update process of the charging station is performed, in which a control arrangement of the one vehicle transmits an up-to-date software package to a control arrangement of the charging station. In the present invention, the terms "the respective vehicles" and "the respective vehicle" and the terms "one of the vehicles" and the "the one vehicle" are distinguished. Here, the term "the respective vehicles" refers to all vehicles that have ever been coupled to the charging station for charging in a current-transmitting manner. If only one of these vehicles is being referred to, the term "the respective vehicle" is used. In contrast, the terms "one of the vehicles" and "the one vehicle" refer to one of the few vehicles that are coupled to the charging station for charging in a current-transmitting manner, and thereby transfer the software package to the charging station.

In the method according to the invention, the first charging unit and the second charging unit can be coupled to each other in a contactless manner or in a current-transmitting manner by cable. Consequently, the method can be carried out both at the charging station for inductive charging of vehicles and at a charging station for charging vehicles by cable. Accordingly, in the case of the charging station for inductive charging, the first charging unit can be a primary coil, which can be inductively coupled in a current-transmitting manner to the second charging unit of the respective vehicle in the form of a secondary coil. In the case of the charging station for charging vehicles by cable, the first charging unit can be a socket or plug, which can be coupled to the second charging unit of the respective vehicle in the form of a plug or socket by cable in a current-transmitting manner. Correspondingly, the respective vehicle can have the second charging unit in the form of the secondary coil for inductive charging at the charging station or in the form of the plug or socket for charging at the charging station by cable. During charging, the control arrangement of the respective vehicle and the control arrangement of the charging station can thereby monitor the charging.

Advantageously, the update process of the charging station can be carried out by the control arrangement of one of the vehicles and thus on demand, such that a manual update by the owner of the charging station can be dispensed with. Furthermore, the method according to the invention enables a timely update of the charging station, such that the charging station is predominantly up to date. In this way, the charging of the respective vehicles can be optimized and power losses occurring during charging due to deviating software versions can be reduced. Furthermore, the update process of the charging station takes place without a direct Internet connection, such that the charging station continues to be optimally protected.

Advantageously, it can be provided that, during charging of the respective vehicle, the up-to-dateness of stored software of the charging station is checked and the update process is started if the stored software is not up to date. When checking the stored software of the charging station, a decision can be made about its up-to-dateness, for example, on the basis of a time of the last update process and/or a software version of the stored software. If the stored software is no longer up to date, the update process can be started and the up-to-date software package can be transmitted to the control device of the charging station. If the stored software is up to date, the charging can be continued without the update process. Expediently, the up-to-dateness of the stored software is checked when charging all of the respective vehicles, and the update process of the charging station is performed as required by the control arrangement of one of the vehicles.

Advantageously, it can be provided that, during the update process, the up-to-date software package for the charging station is transferred to the control arrangement of the one vehicle from an external storage location. The external storage location can, for example, be a database in which the up-to-date software package is made available for download by the control arrangement. The initiation of the update process, and thus the transfer of the up-to-date software package, can expediently occur depending on the up-to-dateness of the stored software of the charging station. Furthermore, during the update process, the up-to-date software package for the charging station can be received wirelessly by the control arrangement of the one vehicle via a first communication module of the control arrangement by means of a data connection. The first communication module can be configured to receive and transmit data according to a standardized transmission protocol. The transmission protocol can, for example, be a transmission protocol according to a GSM or 2G standard (GSM: Global System for Mobile Communications) or according to an UMTS or 3G standard (UMTS: Universal Mobile Telecommunications System) or according to an LTE or 4G standard (LTE: Long Term Evolution) or according to a so-called Bluetooth Standard according to IEEE 802.15.1 or according to another standard. The data connection is thereby preferably secured according to an Internet security standard in order to protect the charging station. Advantageously, the first communication module can have an appropriately designed antenna for receiving and transmitting data.

Advantageously, during the update process, the control arrangement of the one vehicle can transmit the up-to-date software package to the control device of the charging station via a second communication module of the control arrangement wirelessly or by cable. The second communication module can, for example, transmit the up-to-date software package to the control device of the charging station via an antenna by means of a data connection. The antenna of the second communication module is then configured to receive and transmit data according to a standardized transmission protocol. The transmission protocol can, for example, be a transmission protocol according to a GSM or 2G standard (GSM: Global System for Mobile Communications) or according to an UMTS or 3G standard (UMTS: Universal Mobile Telecommunications System) or according to an LTE or 4G standard (LTE: Long Term Evolution) or according to a so-called Bluetooth standard according to IEEE 802.15.1 or according to a so-called WiFi standard according to IEEE-802.11 or according to another standard. The data connection is thereby preferably secured according to an Internet security standard in order to protect the charging station. Advantageously, the control device can have an appropriately designed antenna for receiving and transmitting data to and from the antenna of the second communication module. Alternatively, the second communication module may transmit the up-to-date software package to the charging station control device via a data cable using a standardized data connection. By way of example, the standardized data connection may be a USB (Universal Serial Bus) data connection. Alternatively, the second communication module may transmit the up-to-date software package to the control device of the charging station via the current-carrying connection of the first charging unit to the second charging unit. For this purpose, for example, the up-to-date software package can be transmitted by the second communication module to the control device of the charging station by means of a current modulation.

In accordance with the invention, it is provided that, during the update process in the up-to-date software package for the charging station, an up-to-date software is transferred completely or a change package of an up-to-date software is transferred. The control device of the charging station can then update the stored software to the up-to-date software from the up-to-date software package during the update process. Once the saved software in the charging station has been updated to the up-to-date software, the up-to-date software is now the software saved on the charging station. If the up-to-date software is transferred completely in the up-to-date software package, the updating of the saved software takes place in the known way by overwriting. If the change package of the up-to-date software is transferred in the up-to-date software package, the updating of the stored software takes place by a so-called flashing, where only components of the stored software to be updated are updated or overwritten.

In an advantageous execution of the method according to the invention, it can be provided that during charging of the respective vehicle, the control arrangement of the respective vehicle transmits corresponding status data of the stored software of the charging station to an external database. The transmitted status data of the charging station are then stored in the database, and the up-to-dateness and/or the compatibility of the stored software are monitored using the status data of the charging station stored in the database. The database thus provides an external memory in which the up-to-date status data is collected regardless of the location of the charging station and its accessibility. The status data is transmitted when all of the respective vehicles are being charged, such that the database always contains the most up-to-date status data. This status data can then be used to monitor the up-to-dateness and/or compatibility. The up-to-dateness indicates whether up-to-date software is already available, to which the stored software of the charging station has not yet been updated. The compatibility indicates whether the stored software of the charging station is compatible with the software of any of the vehicles to be charged. If there is no compatibility, the respective vehicles can no longer be charged at the charging station. The method that can be carried out in this way is in particular advantageous for charging stations that are only used periodically or not for a longer period of time—such as a charging station in a summer house or in a small hotel, for example.

When monitoring the up-to-dateness and/or the compatibility, the status data of the charging station stored at a later point in time in the database can replace the status data of the charging station stored at an earlier point in time in the database. In this advantageous way, the more up-to-date status data is preferred in the evaluation and the up-to-dateness and/or the compatibility can be reliably monitored. Advantageously, a time of the last update process and/or a software version and/or a charge throughput of the last charging and/or a time of the last charging can be transmitted with the status data. The time of the last update process and/or the software version and/or the time of the last charging can thus be used for monitoring the up-to-dateness and/or the compatibility. The charging throughput of the last charging can be used as an additional piece of information for the owner of the charging station.

In order to be able to inform the owner of the charging station about the up-to-dateness and/or about the compatibility of the charging station, a warning message can be generated in the method as soon as the stored software of the charging station is no longer up-to-date. In the warning message, the most recent status data stored in the database can be communicated, for example. The warning message can be generated, for example, if the stored software of the charging station has not been updated after a predetermined time interval when up-to-date software is present. Alternatively, or additionally, a warning message can be generated for the owner of the charging station as soon as the stored software of the charging station may become incompatible with software of any vehicles to be charged after a short time interval. Based on the warning message, the owner can update the charging station before a failure or before a so-called dead look of the charging station, whereby costs and effort in the case of a failed charging station are avoided. The method can be particularly advantageous for charging stations that are only used periodically or not for a longer period of time, such as a charging station in a summer house or a small hotel, for example.

Advantageously, it can be provided that the warning message is transmitted to the owner of the charging station via an application software and/or via application software for mobile devices and/or via a control arrangement of a vehicle defined by the owner. Here, the application software can be an email server, for example, to which the warning message is transmitted in the form of an email. The application software for mobile devices can be, for example, a specific application software provided for this purpose for a mobile phone or for a tablet computer or for another mobile device. Furthermore, the control arrangement of the vehicle defined by the owner can be used to display the warning message. The owner of the charging station can, for example, define his/her own vehicle—even if the vehicle is not configured for charging at the charging station—for this purpose and display the warning message, for example, on a monitor controlled by the control arrangement of the defined vehicle. Alternatively, or additionally, the status data of the charging station can be provided in the database for the owner to retrieve. In this case, the owner of the charging station can retrieve the status data of the charging station at any time and thereby monitor the charging station. Alternatively, the owner of the charging station can be contacted via personnel operating the database and the warning message can be transmitted to the owner via personal contact with the owner.

For transmitting the status data of the charging station to the database, it can be provided that the control arrangement of the respective vehicle wirelessly transmits the status data of the charging station corresponding to the stored software of the charging station to the database via a first communication module by means of a data connection. The first communication module is thereby preferably designed to receive and transmit data according to a standardized transmission protocol. The first communication module for sending the status data can here be the same communication module as for receiving the up-to-date software package for the charging station during the update process. The transmission protocol can, for example, be a transmission protocol according to a GSM or 2G standard (GSM: Global System for Mobile Communications) or according to an UMTS or 3G standard (UMTS: Universal Mobile Telecommunications System) or according to an LTE or 4G standard (LTE: Long Term Evolution) or according to a so-called Bluetooth standard according to IEEE 802.15.1 or according to another standard. The data connection is thereby preferably secured according to an Internet security standard in order to protect the charging station. Advantageously, the first communication module can have an appropriately designed antenna for receiving and transmitting data.

In summary, in the method according to the invention, the effort required to carry out the update process at the charging station can be significantly reduced. In particular, the update process of the charging station can be carried out as required by the control arrangement of one of the vehicles, such that a manual update by the owner of the charging station can be dispensed with. Furthermore, the method according to the invention enables the charging station to be updated in a timely manner and the charging station is thus predominantly in the most up-to-date state. In the method, the up-to-dateness and/or the compatibility of the charging station can additionally be monitored, whereby a failure of the charging station can be prevented. In particular, the up-to-dateness and/or compatibility of the charging station can be monitored in a simple and owner-friendly manner, regardless of its location and accessibility.

The invention also relates to a charging station for charging vehicles. In this regard, the charging station has a first charging unit that can be coupled to a second charging unit of the respective vehicle in a current-transmitting manner. In addition, the charging station can have a control device that can monitor the charging of the respective vehicle during charging. According to the invention, the control device of the charging station is configured to carry out the method described above. The charging station can be designed to inductively charge vehicles. In this case, the first charging unit of the charging station is a primary coil which can be inductively coupled to the second charging unit of the respective vehicle in the form of a secondary coil in a current-transmitting manner. Alternatively, the charging station can be designed to charge vehicles by cable. In this case, the first charging unit of the charging station is a socket or a plug that can be coupled to the second charging unit of the respective vehicle in the form of a plug or socket by cable in a current-transmitting manner.

The invention also relates to a vehicle having an electrically chargeable energy storage unit. The vehicle has a second charging unit, which can be coupled in a current-transmitting manner to a first charging unit of the charging station for charging the energy storage device. In accordance with the invention, a control arrangement of the vehicle is designed to carry out the method described above. By way of example, the control arrangement of the vehicle can have a first communication module and/or a second communication module. Furthermore, the control arrangement can also monitor the charging of the respective vehicle.

The first communication module can, for example, be designed for wireless transmission and wireless reception of data according to a standardized transmission protocol by means of a data connection. The transmission protocol can, for example, be a transmission protocol according to a GSM or 2G standard (GSM: Global System for Mobile Communications) or according to an UMTS or 3G standard (UMTS: Universal Mobile Telecommunications System) or according to an LTE or 4G standard (LTE: Long Term Evolution) or according to a so-called Bluetooth standard according to IEEE 802.15.1 or according to another standard. The data connection is thereby preferably secured according to an Internet security standard. The first communication module can be used in the method described above for wirelessly receiving the up-to-date software package for the charging station during the update process and for wirelessly sending the status data corresponding to the stored software of the charging station to the database. Advantageously, the first communication module can have a correspondingly designed antenna for receiving and sending data.

The second communication module can have an antenna designed to receive and send data according to a standardized transmission protocol, for example. The transmission protocol can be, for example, a transmission protocol according to a to a GSM or 2G standard (GSM: Global System for Mobile Communications) or according to an UMTS or 3G standard (UMTS: Universal Mobile Telecommunications System) or according to an LTE or 4G standard (LTE: Long Term Evolution) or according to a so-called Bluetooth standard according to IEEE 802.15.1 or according to a WiFi standard according to IEEE-802.11 or according to another standard. The data connection is preferably secured according to an Internet security standard. Alternatively, the second communication module can have a data cable for transmitting data by means of a standardized data connection. The standardized data connection can be, for example, a USB data connection (USB: Universal Serial Bus). Alternatively, the second communication module can be configured to transmit data through a live connection between the two charging units. The second communication module can be used in the method described above for transmitting the up-to-date software package to the charging unit during the update process, as well as for receiving the status data corresponding to the stored software of the charging unit.

Further important features and advantages of the invention arise from the drawings and from the accompanying figure description based on the drawings.

It is understood that the features mentioned above, and those to be explained below, can be used not only in the combination specified in each case, but also in other combinations or on their own without leaving the scope of the present invention.

Preferred exemplary embodiments of the invention are depicted in the drawings and will be explained in more detail in the following description, wherein identical reference numerals refer to identical or similar or functionally identical components.

BRIEF DESCRIPTION OF THE DRAWING FIGURES

Figure 2:
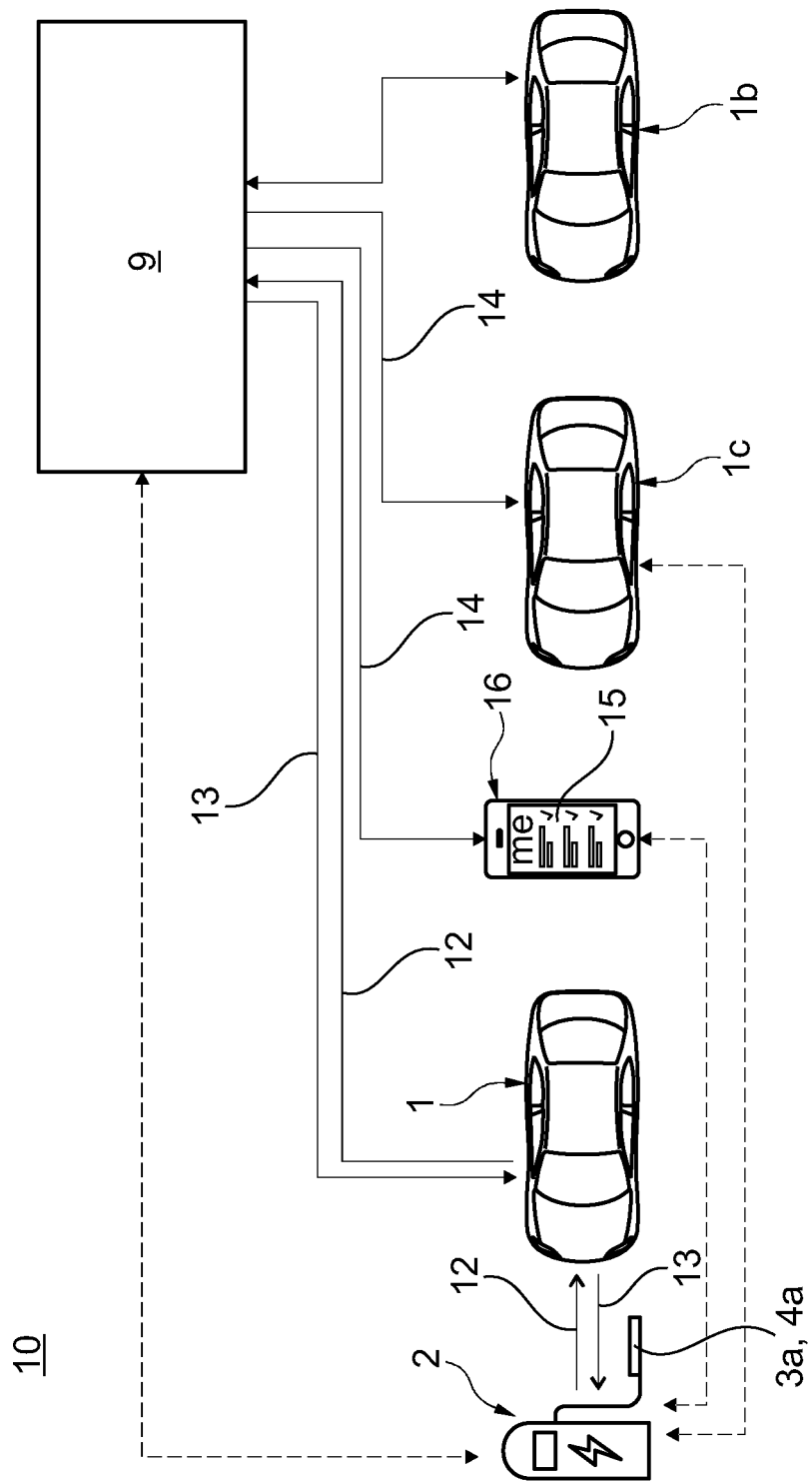

Here are shown:

FIG. 1 a view of a vehicle according to the invention during charging at a charging station according to the invention;

FIG. 2 a communication scheme in a method according to the invention.

DETAILED DESCRIPTION

FIG. 1 shows a view of a vehicle 1 according to the invention during charging at a charging station 2 according to the invention. The charging station 2 has a first charging unit 3a, which can be coupled in a current-transmitting manner to a second charging unit 3b of the respective vehicle 1. In this exemplary embodiment, the charging station 1 is designed for inductive charging, and the first charging unit 3a of the charging station 2 is a primary coil 4a. Accordingly, the second charging unit 3a of the vehicle 1 is a secondary coil 4b that can be inductively coupled to the primary coil 4a of the charging station in a current-transmitting manner. Moreover, the charging station 2 has a control device 5 having an antenna 5a. The vehicle 1 has a control arrangement 6, which has a first communication module 7 with an antenna 7a and a second communication module 8 with an antenna 8a. In this exemplary embodiment, the antenna 7a is designed to transmit and receive data according to a transmission protocol standardized according to the GSM or 2G standard, and can exchange data with an external database 9 by means of a data connection secured according to an Internet security standard. The antenna 5a and the antenna 8a are designed to transmit and receive data according to a transmission protocol standardized according to the WiFi standard according to IEEE-802.11. The antenna 5a and the antenna 8a can exchange data with each other by means of a data connection secured according to an Internet security standard, and thus connect the control device 5 and the control arrangement 6 in a data-transmitting manner.

The charging station 2 is controlled in a method 10 according to the invention. During charging of the respective vehicle 1, the first charging unit 3a of the charging station 2 is coupled to the second charging unit 3b of the respective vehicle 1 in a current-transmitting manner. During charging, the control arrangement 6 of the respective vehicle 1 retrieves status data 12 of the charging station 2 corresponding to a saved software 11 of the charging station 2 and transmits these to the database 9. The transmission of the corresponding data in the method 10 is indicated here with solid arrows. The database 9 stores the status data 12 and monitors the up-to-dateness and/or compatibility of the stored software 11. In this way, the database 9 provides an external memory in which the up-to-date status data 12 is collected independently of the location of the charging station 2 and its accessibility. The status data 12 is thereby transmitted when each of the respective vehicles 1 is charged, such that the most up-to-date status data 12 relating to the respective charging station 2 is available in the database 9.

When charging the respective vehicle 1, the transmitted status data 12 of the charging station 2 can additionally be checked for up-to-dateness in the database 9 or also by the control arrangement 6 of the respective vehicle 1. The up-to-dateness of the status data 12 can be decided, for example, based on a time of the last update process and/or a software version of the stored software 11. If the stored software 11 is not up to date, an update process can then be started and an up-to-date software package 13 can be transmitted to the control arrangement 6. The up-to-date software package 13 can then be transmitted to the control device 5 of the charging station 2 via the data-transmitting connection between the control device 5 and the control arrangement 6. The control arrangement 5 then updates the stored software 11 to software corresponding to the up-to-date software package 13. If the stored software 11 is up to date, charging can continue without the update process. The update process of the charging station 2 is performed as required by one of the vehicles 1, such that a manual update by the owner of the charging station 2 can be omitted. Furthermore, a timely update of the charging station 2 can be performed, such that the charging station 2 is predominantly up to date. In particular, this can optimize the charging of the respective vehicles 1 and reduce power losses occurring during inductive charging. Furthermore, the update process of the charging station 2 takes place without a direct Internet connection, such that the charging station 2 is optimally protected.

FIG. 2 now shows a communication scheme in the method 10 according to the invention. As indicated by solid arrows, when the respective vehicle 1 is charged at the charging station 2, the up-to-date status data 12 is transmitted to the database 9. If the update process of the charging station 2 is carried out, the up-to-date software package 13 is also transmitted to the charging station 2. The data transmission between the charging station 2 and the database 9 takes place via the respective vehicle 1. A virtual data connection is thus created between the charging station 2 and the database 9, as indicated by dashed arrows. After the status data 12 has been stored in the database 9, it is monitored for up-to-dateness and/or compatibility. The up-to-dateness indicates whether there is already an up-to-date software to which the stored software 11 of the charging station 2 has not yet been updated. The compatibility indicates whether the stored software 11 of the charging station 2 is compatible with software of any vehicles 1b to be charged. If there is no compatibility, charging of any of the vehicles 1b to be charged can no longer be performed at the charging station 2.

In order to be able to inform the owner of the charging station 2 about the up-to-dateness and/or about the compatibility of the charging station 2, a warning message 14 is generated in the method 10 for the owner of the charging station 2. This is transmitted to the owner of the charging station 2 as soon as the stored software 11 of the charging station 2 is no longer up-to-date and/or may become incompatible with a software of any of the vehicles 1b to be charged after a short period of time. In the warning message 14, the last status data 12 stored in the database 9 or also other information can additionally be transmitted. Based on the warning message 14, the owner can be forewarned and update the charging station 2. In this way, a failure or a so-called dead look of the charging station 2 can be prevented. The warning message 14 can be transmitted to the owner of the charging station 2 via an application software 15 for a mobile device 16 and/or via a control arrangement of a vehicle 1c defined by the owner—for example, his/her own vehicle—as indicated by solid arrows. In this way, a virtual data connection is created between the mobile device 16 and the charging station 2 and between the vehicle 1c and the charging station 2, as indicated with dashed arrows. Alternatively, or additionally, the status data 12 of the charging station 2 can be provided in the database 9 for the owner to retrieve. In this case, the owner of the charging station 2 can retrieve the status data 12 of the charging station 2 at any time and thus monitor the charging station 2.

In summary, in the method 10 according to the invention, the effort required to perform the update process at the charging station 2 can be significantly reduced. In particular, a manual update of the charging station 2 can be omitted and the update process of the charging station 2 can be performed by the control arrangement 6 of the one vehicle 1 in a simplified manner. In the method 10, moreover, the up-to-dateness and/or the compatibility of the charging station 2 can be monitored, which can prevent a failure of the charging station 2 regardless of its location and accessibility.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:

1. A method for controlling a charging station for charging vehicles, wherein, when charging the vehicles, a first charging unit of the charging station is coupled for power transmission to a second charging unit of each of the vehicles, the method comprising:
when charging of one of the vehicles, an update process of the charging station is performed in which a control arrangement of the one of the vehicles transmits an up-to-date software package to a control device of the charging station;
in the update process an up-to-date software is transmitted completely or a change package of the up-to-date software for updating components to be updated is transmitted in the up-to-date software package for the charging station; and
during the update process the control device of the charging station updates a stored software from the up-to-date software package to the up-to-date software.

2. The method of claim 1, wherein, during the charging of the vehicles, how current the stored software of the charging station is checked and the update process is started if the stored software is not up-to-date.

3. The method of claim 1, wherein during the update process, the up-to-date software package for the charging station is transferred to the control arrangement of the one of the vehicles from an external memory location.

4. The method of claim 3, wherein during the update process, the up-to-date software package for the charging station is received wirelessly by the control arrangement of the one of the vehicles via a first communication module of the control arrangement, wherein the first communication module receives and transmits data in accordance with a standardized transmission protocol via a data connection secured in accordance with an Internet security standard.

5. The method of claim 1, wherein during the update process, the control arrangement of the one of the vehicles transmits the up-to-date software package to the control device of the charging station wirelessly or by cable via a second communication module of the control arrangement.

6. The method of claim 5, wherein
the second communication module transmits the up-to-date software package to the control device of the charging station via an antenna that receives and transmits data according to a standardized transmission protocol via a wireless data connection secured according to an Internet security standard,
the second communication module transmits the up-to-date software package to the control device of the charging station via a data cable via a standardized data connection, or
the second communication module transmits the up-to-date software package to the control device of the charging station via a current carrying connection between the first charging unit and the second charging unit.

7. The method of claim 1, wherein
during charging of the vehicles, a control arrangement of the vehicles transmits status data of the charging station regarding the stored software of the charging station to an external database,
the status data of the charging station are stored in the external database, and
how current and/or a compatibility of the stored software is/are monitored using the status data of the charging station stored in the external database.

8. The method of claim 7, wherein
a time of a most recent update process, a software version, a charge throughput of a most recent charging, and/or a time of the most recent charging are transmitted with the status data, and/or
when monitoring how current and/or the compatibility of the stored software, the status data of the charging station that is stored in the external database at a later point in time replaces the status data of the charging station stored in the external database at an earlier point in time.

9. The method of claim 7, wherein
a warning message is generated for an owner of the charging station as soon as the stored software of the charging station is no longer up-to-date, and/or
a warning message is generated for the owner of the charging station as soon as the stored software of the charging station can become incompatible with software of any vehicles to be charged after a short period of time.

10. The method of claim 9, wherein
- the warning message is transmitted to the owner of the charging station via application software, application software for mobile devices, and/or via a display of a control arrangement of a vehicle defined by the owner, and/or
- the status data of the charging station is made available to the owner for retrieval from the external database.

11. The method of claim 7, wherein
- the control arrangements of the vehicles each transmit the status data of the charging station corresponding to the stored software of the charging station wirelessly to the external database via a first communication module, which receives and transmits data in accordance with a standardized transmission protocol via a data connection secured in accordance with an Internet security standard.

12. A charging station for charging vehicles, wherein the charging station comprises:
- a first charging unit which can be coupled in a current-transmitting manner to a second charging unit of a vehicle; and
- a control device configured to
  - when charging the vehicle, perform an update process of the charging station in which a control arrangement of the vehicle transmits an up-to-date software package to the control device; and
  - during the update process the control device updates a stored software from the up-to-date software package to up-to-date software, wherein in the update process, the up-to-date software is transmitted completely or a change package of the up-to-date software for updating components to be updated is transmitted in the up-to-date software package for the charging station to the vehicle.

13. The charging station of claim 12, wherein
- the charging station is configured to inductively charge the vehicle, wherein the first charging unit of the charging station is a primary coil that can be inductively coupled for power transmission to the second charging unit of the vehicle, wherein the second charging unit of the vehicle is a secondary coil, or
- the charging station is configured to charge the vehicle by cable, wherein the first charging unit of the charging station is a socket or a plug that can be coupled to the second charging unit of the vehicle, wherein the second charging unit is a plug or socket.

14. A vehicle, comprising:
- an electrically chargeable energy storage device;
- a second charging unit, which can be coupled for power transmission to a first charging unit of a charging station for charging the electrically chargeable energy storage device; and
- a control arrangement configured to
  - when charging the vehicle, an update process of the charging station is performed in which a control arrangement of the vehicle transmits an up-to-date software package to a control device of the charging station; and
  - in the update process an up-to-date software is transmitted completely or a change package of the up-to-date software for updating components to be updated is transmitted in the up-to-date software package for the charging station, wherein during the update process, the control device of the charging station updates a stored software from the up-to-date software package to the up-to-date software.

* * * * *